United States Patent [19]
Kosik, Jr.

[11] 3,966,380
[45] June 29, 1976

[54] APPARATUS FOR LOADING AND UNLOADING PRESSES

[76] Inventor: Samuel J. Kosik, Jr., Box 231, Botkins Angle Road, New Knoxville, Ohio 45871

[22] Filed: Mar. 10, 1975

[21] Appl. No.: 556,964

Related U.S. Application Data

[62] Division of Ser. No. 356,592, May 2, 1973, abandoned.

[52] U.S. Cl. .............................. 425/338; 100/196; 214/1 B; 214/16.4 R; 425/406; 425/455 R
[51] Int. Cl.² .......................................... B29C 3/00
[58] Field of Search ........... 425/338, 406, 233, 317, 425/455; 100/258 R, 196; 214/1 B, 16.4 R

[56] References Cited
UNITED STATES PATENTS

| | | | |
|---|---|---|---|
| 709,285 | 9/1902 | Wilkes | 425/338 |
| 1,332,457 | 3/1920 | Burkhardt | 425/338 |
| 1,607,073 | 11/1926 | Gras | 264/297 |
| 2,338,329 | 1/1944 | Hermanns | 425/338 X |
| 3,242,532 | 3/1966 | Borah | 425/338 |
| 3,518,724 | 7/1970 | Book | 425/338 |
| R27,223 | 11/1971 | Nelson | 425/338 X |

Primary Examiner—Robert L. Spicer, Jr.

[57] ABSTRACT

There is disclosed a method and apparatus for molding rubber or similar products, involving the use of a press which is disclosed as being vertically arranged with hydraulic operation being provided by a hydraulic piston and cylinder apparatus which includes means for moving a series of platens upwardly to compress therebetween certain molds which are inserted therein, the platens being adapted to be suspended in open condition when the hydraulic means is appropriately actuated, there being provided at each side of the press a series of mold supports which are arranged to move as by swinging from the side of the press around into position to permit molds carried thereby to be inserted in and withdrawn from the press, the contemplation being that sequential operation of these mold supports will be effected whereby molds may be loaded with raw material while a previously loaded series of molds is in the press between the platens thereof, said last named series being withdrawn and the first series now loaded arranged to move the molds with the raw material therein into the openings provided by spaces between the platens for subsequent pressure and heating of the molds to provide the finished products.

1 Claim, 4 Drawing Figures

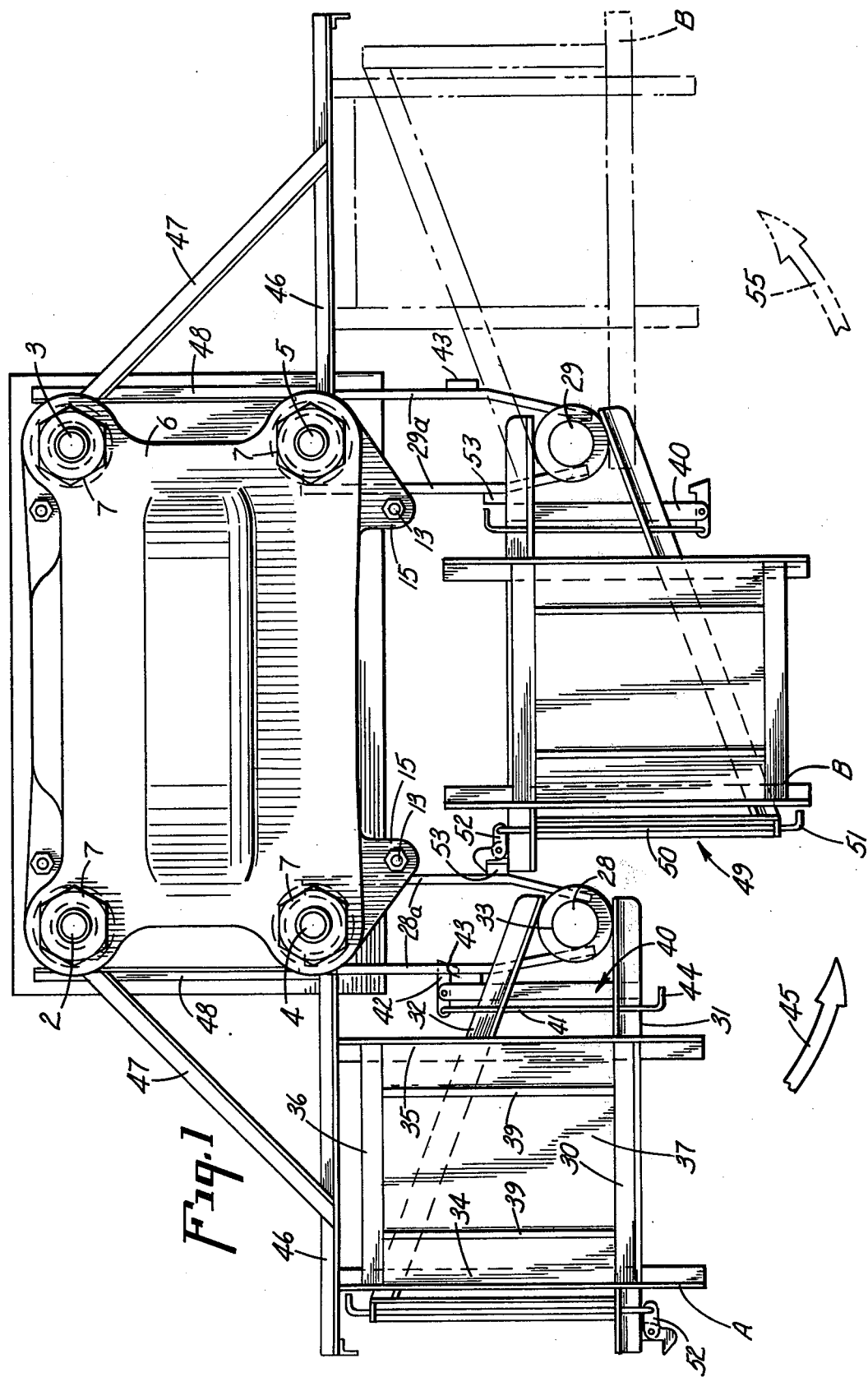

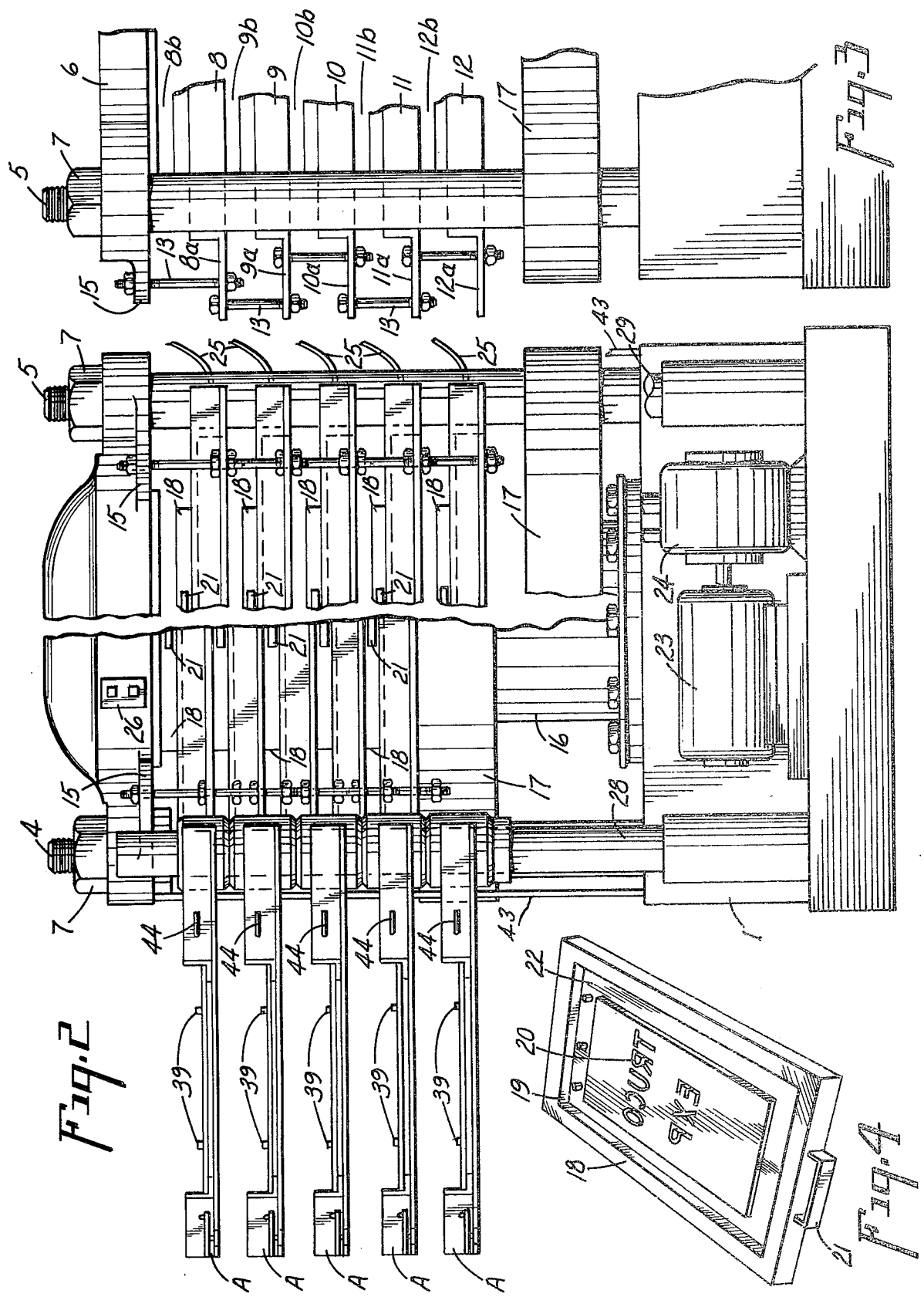

APPARATUS FOR LOADING AND UNLOADING PRESSES

This application is a division of application Ser. No. 356,592 filed May 2, 1973, now abandoned.

OBJECTS OF THE INVENTION

It is a primary object of this invention to provide a method of molding which will materially increase the productive capacity of a single press, since rather than having to handle each of the molds in the usual manner of lifting and hauling same into position in a press between a platen and a header thereof for subsequent heating and pressing to provide a finished part, in this instance the mold, may be supported on a wing-like member to swing into a loading position and into a position for charging the press with the mold, the mold thereafter being removed and unloaded at the original loading position, the contemplation being that sequential operation of these supporting members at opposite sides be effected to eliminate down time while molds are being charged into the press.

Another object of the invention is a method in which a series of molds may be charged into the press, the platens in fact being limited in number only by the size of the press, effective finishing of the mold in the press being subsequently accompanied by removal therefrom and handling without severe strain on the part of an operator or the like.

Another object of the invention is to provide a press in which a series of platens are arranged therein, whereby upon opening of the press the platens are suspended in spaced relation so that molds may be inserted into the spaces, wing-like members swung into position to align the molds for charging into the press, the wing-like material being movable to one side for loading with the material to be molded, and again swung into position to charge the press after the previously inserted molds havve been withdrawn on a complementary set of wing-like members at the opposite side of the press, and swung out of position to permit the next series to be swung into position and charged into the press.

Another object of the invention is to facilitate the movement of molds to and from a position for loading and unloading sequentially, and charging and receiving molds from a press in a similar manner with molds being supported at relatively remote positions and moved into close position to the press for the molding operation to be effected.

Other and further objects of the invention will be understood from the specification appended hereto and disclosed in the drawings, wherein:

FIG. 1 is a top plan view, somewhat fragmentary in nature, disclosing the arrangement of the press with the mold support means, comprising wing-like members at positions for loading and unloading, and charging and discharging of molds in accordance with the method hereof.

FIG. 2 is a view, partly fragmentary in nature, to illustrate the various positions of the platens and the relationship of the mold support means thereto, with open and closed position of the press being illustrated in halves thereof.

FIG. 3 is a fragmentary side view of the press to illustrate the manner of support of the platens during the open position of molding operation.

FIG. 4 is a perspective view of a mold such as is used in this method and apparatus.

DESCRIPTION OF THE INVENTION

Referring now to the drawings, the press hereof is disclosed in FIG. 2 as comprising a base 1, of substantial dimension both vertically and in plan, upwardly from which extend four columns 2,3,4 and 5, these columns being fixed to the base at their lower ends, and at their upper ends supporting a header 6 substantially rectangular in outline and in plan, maintained in position by the large nuts 7 in each case, one being supplied for each of the columns as will be apparent.

Suspended within the general outline of the press as viewed in FIG. 1, and more particularly shown in detail in FIGS. 2 and 3, is a series of platens 8,9,10,11 and 12, which platens are arranged to be suspended as disclosed in FIG. 3 by means of suitable rods such as 13 which are in reality of course nuts and bolts or the equivalent, the platens having the offstanding portions 8a, 9a, etc. whereby all of the platens are in fact suspended from the nut and bolt unit 13 which is connected to an offstanding ear such as 15, there in fact being four of such ears provided on the header to maintain the support desired and required for the platens.

Since the nuts and bolts 13 are free to move in suitable openings provided in the extensions 8a, 9a, etc., upward and downward movement of the platens 8 through 12 inclusive, may be effected by the hydraulic piston 16, engaging a table 17 thereabove to move the platens upwardly against the header 6.

It will therefore be apparent that there is a series of openings provided between the platens 8 through 13 inclusive when the hydraulic piston and cylinder 16 moves downwardly permitting the table 17 to move downwardly likewise, and thereby the platens will separate and be suspended on the respective bolts 13.

The platens are of course guided by movement along the columns 2,3,4 and 5, and thus follow a prescribed path as will be understood.

The reason for providing the platens in this manner is to receive in the openings such as 8b, 9b, 10b and 11b and 12b molds such as are illustrated in FIG. 4 and denominated 18.

The mold 18 is exemplary of a suitable mold usable in this method and apparatus, and is generally rectangular in shape with a suitable cavity such as 19 therein to receive moldable material and even suitable lettering arranged in manner to produce a finished product which will provide legible information thereon, for example, the mold having a handle such as 21 thereon for sliding movement in a manner to be subsequently explained.

The mold bottom is provided at 22 being a flat plate, there being in this case no mold top required since the platens provided in the press are usable because of the flat nature of the material being molded, although it is apparent that a separate top could be provided if necessary, but not required.

The actuation of the press is effected by a drive motor such as 23, operating an hydraulic pump 24, and by any suitable source of power, to apply the necessary hydraulic pressure to move the hydraulic piston 16.

The platens in each case are intended to be heated as suggested by the wire such as 25, connected to each, from a suitable source of power, the control panel such as 26 being provided to control this power as well as to effect movement of the hydraulic piston 16 in the press generally.

While the press just described is somewhat conventional as to its general make-up, it is quite different when it is considered that the platens are adapted to be suspended as disclosed to provide the necessary openings to receive the mold therebetween.

Referring again to FIG. 1, a further pair of columns designated 28 and 29 respectively as viewed in plan in FIG. 1, and indicated likewise of course in elevation in FIG. 2, these being round columns supported on the base and maintained in spaced relation to the press by suitable bracing elements such as 28a and 29a.

Since both columns will have substantially identical support members carried thereby, those described in detail will be the support members carried by column 28, and in this case are comprised of a frame generally designated 30, consisting of a pair of arms 31 and 32 fastened at one end to a bearing member 33, mounted on the column 28, so as to be swingable with regard thereto, the frame members 31 and 32 further being connected to a pair of parallel frame members such as 34 and 35, which in this case may be angular in form, with additional braces such as 36 connecting said member 34 and 35 at the rear, all of this being further provided with a plate of generally rectangular configuration and plan designated 37 which is welded and securely fastened to each of the members 34 and 35, and 36, as well as the arms 31 and 32 so as to form a ring-like member or support means of something like a platform with the bars 39 fastened to the surface to provide for sliding molds therealong, being guided by the members 34 and 35 into position as will be understood on the wing-like member when it is in the location such as suggested to FIG. 1 at the left of the figure in full lines.

In order to maintain the wing-like member now being described, in position, this member being generally designated as A, the latch structure 40 is provided, including a control arm 41, a latch 42 engaging a vertical latch bar 43, the control member 41 being adapted to be moved by pulling on the handle portion 44 thereof and releasing it from the latch bar 43. Such release will permit the support means or member A to be swung in a counter-clockwise direction as suggested by the arrow 45 to a position whereby a mold supported on the member is in alignment with an opening 8b for example, at the top of the press.

Since the position shown at the left in FIG. 1 of the member A now being described is in what may be termed the loading and unloading position, it is desirable to provide a stop in the from of a framework such as 46 with suitable bracing 47 and 48, all fastened in a manner to make the same rigid and stiff and resist the bumping action which may be caused in moving the member A in swinging of the same from the position in front of the press to the position remote therefrom as suggested at the left in FIG. 1.

A series of members A is provided at the left of the press as heretofore described, and a similar series B is provided at the opposite side of the press, being shown in comparable position in dotted lines therein, but in this instance in reference to the wing-like member B, in charging position whereby a mold supported thereon may be moved into the opening 8b as by sliding the same with use of the handle 21 as shown in FIG. 4.

Since the structure of the wing-like members in the series B is substantially identical to that in the series A but on the opposite hand, no detailed description of that member will be supplied except for the latch member which is additionally provided denoted at 49 as comprising a latch bar 50, having the handle 51 theron connected to a latch 52 which may engage with a lock member 53 in the form of a vertical bar behind which the end of the latch may be moved and manipulated by the handle 51 as the case may be. It will be apparent that each of the series of wing members A and B is provided with a latch 39 as well as a latch 40 previously described.

With the foregoing description of various elements in the press structure being noted that a suitable top unit, including the parts 46,47 and 48 is provided at the right hand side of the press as is true at the left, as viewed in FIG. 1, to provide for the accepting the impingement of the wing-like members in the series B thereagainst.

With the foregoing in mind, it being understood that the series of wing-like members A and B may be swung from side to side and into position in front of the press for charging and discharging, detailed description of the operation will now be set forth.

As viewed in FIG. 1, it will be assumed that the molds 18 are in the press, with the press closed, having been discharged thereinto from the series of the members B.

Such members B are thereafter swung into the dotted line position shown at the right-hand, and in the direction of the arrow 55 so that the series of mold support means A may be manipulated. With the molds supported on the uppermost Member A, the same is loaded with material and then moved temporarily into position corresponding to that of the series B in FIG. 1, and the mold resting on the next successive wing-like member A is loaded with material and again swung into temporary position in front of the opening of the press.

After each of the series A mold support means is loaded, the entire units are swung again back to the position shown in full lines in FIG. 1 at the left of the press, and the series of support means B is swung into position as shown in full lines in FIG. 1 in front of the press.

Thereafter the press is opened, permitting the platens to move into the condition shown in FIG. 3, separated so as to permit the molds therebetween to be withdrawn, the uppermost mold being thereafter withdrawn on to the uppermost support means B, this means being interlocked by the latch 49 and swung to the dotted line position of FIG. 1, with the successive mold support means 8, 9, 10, 11 and 12 being similarly manipulated to receive molds thereon from the press after the molding operation to completed.

Since the molds in the series A support means are loaded, they may now be moved, either one at a time or in a group, into the position in front of the press and the molds pushed off into the press in the openings provided as previously set forth, and the press thereafter closed immediately.

While the press is in operation, the series of molds on the support means B will be loaded one at a time for subsequent movement into the full line position shown in FIG. 1.

It will therefore be apparent that by sequential manipulation of the various series of support means A and B and the respective units thereof, while loading of the molds is taking place the pressing or molding operation is also taking place, and when the molds are removed from the press, the now loaded molds may be moved into position to be moved into the press, or charged thereinto as may more properly be the description.

It will therefore be apparent that a molding method is provided which avoids down time substantially since appropriate movement of the respective mold support means comprising the wing-like members A in the series and B in another series is resorted to in the manner described or in any other appropriate manner which will accomplish the desired end of maintaining the press in operation for the longest period of time, avoiding down time which is usually the result of having to move only one series of molds into the press or loading them and unloading them in a different manner.

I claim:

1. In apparatus of the class described, in combination, a press comprising a base, a header spaced therefrom and connected thereto, a series of platens for supporting molds adjustably supported in spaced relation between the base and header, said spaced relation providing for receiving molds therebetween, while facilitating opening and closing movement thereof, means comprising adjustable connections from the header to an adjacent platen and from each adjacent platen to the platen adjacent thereto, to support molds of substantially different thicknesses between any of said platens during repeated opening and closing movement, table means to move the platens toward the header and to support the platens upon movement away from the header, a series of means at opposite sides of said openings to support molds for loading the same with moldable material and unloading molded products from such molds, such means including instrumentalities to enable the molds to be moved into alignment with the openings and to receive molds therefrom to be thereafter moved to one side or the other of the openings on the support means, the series of means at one side for supporting a series of first molds, and the series at the other side supporting a series of second molds, and being swingable toward and from the openings, the said support means being wing-like members separately swingable toward and from the openings.

* * * * *